Oct. 28, 1947.  J. S. PEAKE ET AL  2,429,959

ELECTRIC FURNACE FOR MELTING MAGNESIUM AND ITS ALLOYS

Filed Jan. 26, 1946

INVENTORS.
John S. Peake
George T. Sermon
BY

Griswold & Burdick
ATTORNEYS

Patented Oct. 28, 1947

2,429,959

UNITED STATES PATENT OFFICE 2,429,959

ELECTRIC FURNACE FOR MELTING MAGNESIUM AND ITS ALLOYS

John S. Peake, Midland, and George T. Sermon, Bay City, Mich., assignors to The Dow Chemical Company, Midland, Mich., a corporation of Delaware Application January 26, 1946, Serial No. 643,782

1 Claim. (Cl. 13—23)

The invention relates to an improved method of and means for melting and maintaining in the molten state magnesium and alloys thereof in which magnesium is the predominant constituent.

The melting of magnesium for use in alloying and founding operations with magnesium alloys has heretofore been carried out in either the reverberatory furnace under a cover of fused flux or in externally-heated steel or iron pots or crucibles. These methods, however, have serious disadvantages. Both the reverberatory furnace and the pot methods of melting are inefficient in the use of fuel and flux and incur considerable loss of metal through oxidation, the pot method being also limited in its application to the melting of comparatively small batches of metal. In the pot method, the magnesium or alloys thereof so-melted are always contaminated with iron, the presence of which in the metal is very undesirable due to its adverse effects on corrosion resistance. In addition, the melting flux used forms on the bottom of the pot a sludge which is of low thermal conductivity, so that the pot becomes overheated and is eventually weakened to a point where it becomes a hazard and must be replaced. In the reverberatory furnace method, the consumption of flux is excessive due to the high temperature and water vapor content of the combustion gases to which the exposed surface of the flux is subjected. At such temperatures, the moisture in the combustion gases readily hydrolyzes the flux producing an excessive amount of oxidic sludge and it is difficult, if not impossible, to remove from the furnace without incurring a loss of metal and flux. In addition, the combustion gases circulating in the furnace and passing out with the stack gases assist in carrying out the furnace vapor of flux which easily vaporizes at combustion gas temperature. It is oftentimes desirable to "superheat" molten magnesium alloys prior to casting, in order to control the grain size of the cast metal, as by heating the metal to a temperature about 200 or more centigrade degrees above the melting point. In superheating the metal with conventional foundry methods, the aforementioned difficulties are still further increased. Furthermore, the separation of the molten metal from the flux after the fluxing operation, and the removal of the oxidic impurities from the molten metal by the flux are not always sufficiently perfect in conventional founding practice for the fluxed metal to be classed as flux- and oxide-free. Despite all these disadvantages, no other melting operation has been commercially available with sufficient improvement to meet with any commercial acceptance.

It is an object of the invention to provide an improved method of melting and maintaining in the molten state magnesium and alloys thereof not subject to disadvantages of methods heretofore commercially available.

A particular object of the invention is to provide a method of melting magnesium and alloys thereof in the presence of a flux therefor without excessive consumption thereof and without excessive sludge formation.

Another object of the invention is to provide an efficient method of melting magnesium and alloys thereof without subjecting the metal to contamination by metallic iron.

Another object is to provide a method of melting magnesium and alloys thereof which does not require the use of steel containers and, hence, eliminates the hazards due to failure of the melting vessel.

Another object is to provide a method of melting and fluxing magnesium which improves the separation of oxidic contaminants and flux from the metal.

Still another object is to provide a method of melting, alloying, and conditioning molten magnesium and alloys thereof which is highly efficient thermally and subject to easy and precise control.

Other objects and advantages will appear as the description of the invention proceeds.

According to the invention, a body of molten magnesium or alloy thereof is maintained in the molten state in a non-metallic refractory vessel by superimposing the liquid metal upon a body of a molten flux therefor having a higher specific gravity than the metal, the flux being supplied with the necessary heat to maintain it and the magnesium or alloy thereof in the molten state electrothermally, as by the passage of a non-electrolyzing electric current through a conducting path within the flux. The term "non-electrolyzing electric current" is used herein and in the appended claims to mean any alternating electric current which does not cause a continuous liberation of electrolysis products from the flux. The ordinary alternating current of 25 to 60 cycles per second is an example of a non-electrolyzing current for use according to the invention. It will be understood that the current path is at least a portion of the flux body itself but may also include another conductor that conducts the current electronically, as a graphite or carbon resistor submerged in the flux which, therefore, assists in the electrothermal heating of the flux. When the current path includes an electronic conductor as a resistor, the electrothermic current divides itself between the flux and the electronic conductor therein, in accordance with the laws of electrical conduction in conductors connected in parallel and in electrical contact throughout their lengths, one being an electrolytic conductor and the other an electronic conductor. The form of the body of the molten flux should be such that the electrodes bringing the heating current into it are submerged so that the molten metal is kept out of contact with them.

For the flux body, fluxes are chosen composed largely of the chlorides of magnesium and potassium or sodium and a chloride of an alkali earth metal, one or more of these last-mentioned chlorides being used to make the specific gravity of the flux at least slightly greater than that of the molten metal at the temperatures encountered in operation. For example, for melting unalloyed magnesium, a flux composed of about 55 to 70 parts of potassium chloride, about 30 to 45 parts of anhydrous magnesium chloride, about 8 to 12 parts of barium chloride, and up to about 4 parts of calcium fluoride is satisfactory. When the magnesium is alloyed and its specific gravity thereby altered, the flux's specific gravity is adjusted accordingly, for example, a flux composed of about 55 parts of potassium chloride, about 34 parts of magnesium chloride, about 9 parts of barium chloride, and about 2 parts of calcium fluoride, is suitable for any of the usual commercial magnesium-base alloys. Such fluxes also have the property of creeping over the upper surface of the metal and thus afford it protection from attack by the ambient atmosphere. It may be noted in this connection that any desired ambient atmosphere may be provided over the molten metal to supplement or modify the protective or other action of the flux. For example, a gas non-reactive with magnesium, such as helium, argon, or the like, may be used.

By heating the flux electrothermally in accordance with the invention, the heat produced by the electric current is very efficiently carried to the metal which floats on the flux in intimate contact therewith. The economies and advantages of so heating the flux and metal are thus made use of for melting and maintaining safely in the molten state magnesium and alloys thereof with negligible loss of either flux or metal despite the extreme ease with which these metals oxidize when molten, and without significant iron contamination and trouble from sludge formation. In addition, greater freedom from oxide and flux inclusions in the metal is obtained.

The principle of the invention may be used advantageously in melting magnesium or magnesium alloy ingots by providing in a refractory vessel a substantial pool of molten flux kept hot electrothermally as by the passage through it of an alternating current of sufficient magnitude, and introducing the ingots into the pool. When the flux composition is suitably compounded so as to give it the proper specific gravity, the ingots will normally sink and remain more or less submerged in the pool during melting, the molten metal rising to the top of the flux pool and usually becoming covered with a thin film of flux which creeps over the upper surface of the molten metal. If desired, alloying metals, such as aluminum, manganese, zinc, etc., with which magnesium is to be alloyed may be added to the melt and the melt agitated so as to ensure uniform mixing of the alloying metal with the magnesium.

This operation of adding metal to be melted may be made in effect continuous by adding metal to the pool at regular intervals and withdrawing molten magnesium at a rate corresponding approximately to that at which the ingots are added. Molten metal may be introduced into the pool instead of solid metal, if desired, as when the metal is to be maintained in the molten state for subsequent use, or for alloying, or for other treatment.

The process of the invention may be further explained by reference to the accompanying drawing in which.

Figure 1:
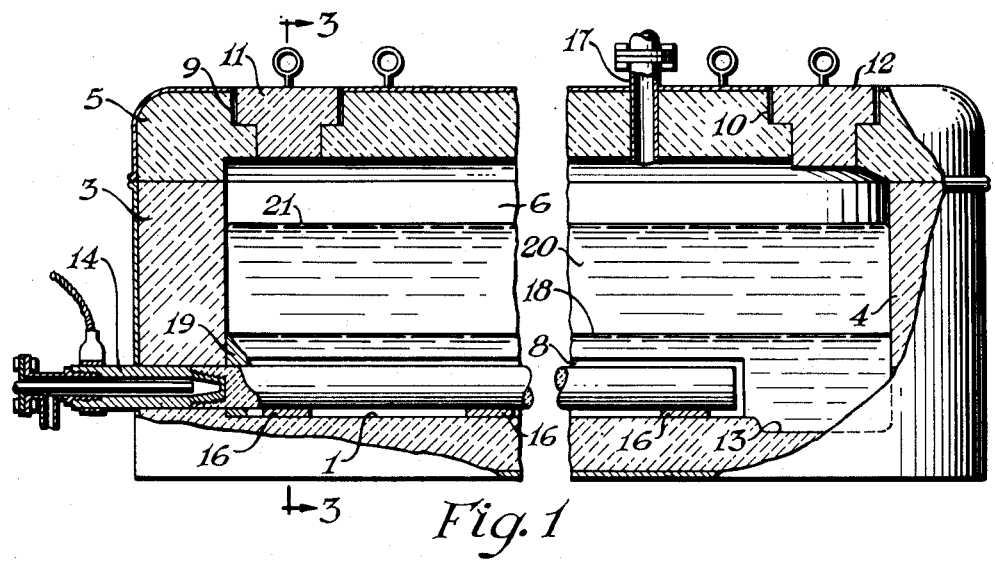
Fig. 1 is a side elevation largely in section of a furnace adapted for use in carrying out the process.
Figure 2:
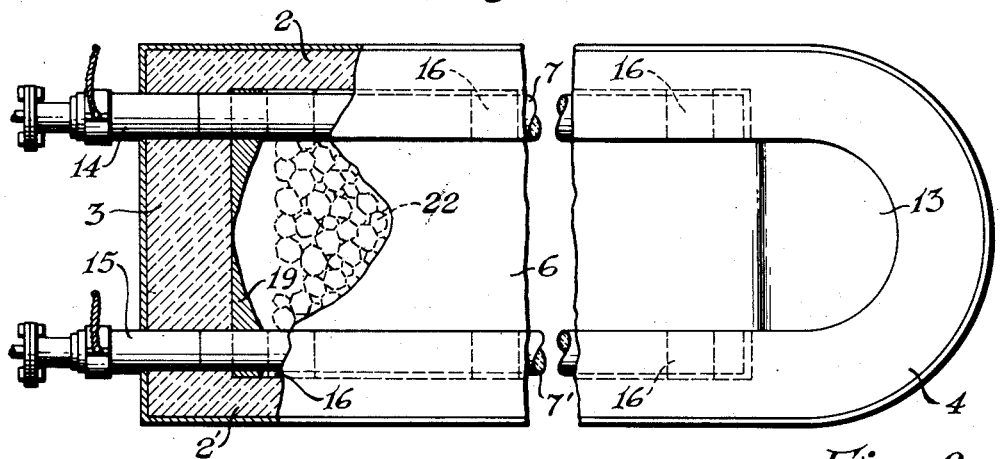
Fig. 2 is a plan view largely in section of the same furnace.
Figure 3:
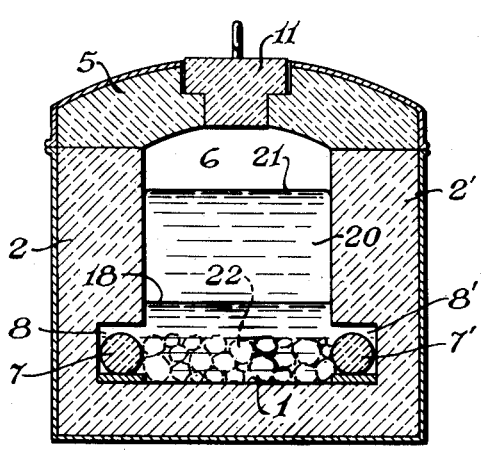
Fig. 3 is a section of the same furnace along the line 3—3 of Fig. 1.

The furnace illustrated may be of the covered or open hearth type, being formed of a metal shell lined with a refractory material, e. g. alumina or fire clay brick, or other suitable ceramic material, forming the interior. As shown, the furnace is constructed with a floor or hearth 1 with side walls 2—2' and ends 3 and 4, the latter preferably being semicircular as shown, and roof 5 defining a furnace chamber 6 having in its lower portion electrodes 7—7' positioned in recesses 8—8' in the walls 2—2', respectively, the electrodes extending substantially the length of the hearth. The roof of the furnace is provided with openings 9 and 10 providing access to the furnace, the openings being provided with removable closures 11 and 12, respectively. If desired, the roof may be constructed so as to be removable. At one end of the hearth, a sump 13 is provided, the floor level of which is below that of the floor or hearth.

The electrodes are provided with fluid-cooled terminals 14 and 15, respectively, extending into the end 3 of the furnace. Supports 16 are provided under the electrodes so as to space them from the bottom of the recesses in the furnace walls. A pipe connection 17 extending through the roof of the furnace is provided for the admission of special atmospheres.

In starting the furnace, a quantity of flux is charged into the furnace in amount sufficient to form a current path between the electrodes and a gas or oil fired torch is applied so as to melt the flux while an alternating current potential is applied to the terminals of the electrodes. As the flux melts, it becomes a good electrical conductor and a current passes through the flux producing heat electrothermally in amount sufficient to maintain the flux in the molten state without the torch which is then removed. Additional flux is added and melted, the addition and melting being continued until a sufficient depth is obtained to fully submerge the electrodes and form a molten flux pool as indicated by 18.

If desired, the resistance of the current conducting path between the electrodes may be reduced by introducing into the path an electronic conductor as a resistor. For this purpose, pieces, such as chunks, bars, or rods, or the like, of carbon or graphite may be placed in contact with each other between and in contact with the electrodes so as to form an electronically conducting path between the electrodes, as indicated at 22. Such material, being submerged in the flux, carries some of the electrothermal current and assists in evolving heat within the flux electrothermally. It also facilitates the starting operation as the conducting pieces may be so arranged as to form a continuous electronic conductor extending from one electrode to the other, thereby permitting heat to be generated as soon as the heating current is applied. As the conducting pieces become heated, flux may be added and a molten flux pool formed by gradual additions of flux as it melts until the desired flux depth is obtained. After the flux is melted, some of it permeates the refractory lining, thereby protecting the lining from attack by the molten magnesium, the magnesium being also thereby protected from contaminants from the refractory.

Cooling fluid is applied to the terminals so as to freeze a portion of the flux at the ends of the electrodes adjacent to the wall of the furnace chamber, the frozen flux indicated by 19—19' serving as a seal preventing the escape of the flux from the furnace wall and protecting the refractory lining between the electrodes from the passage of excessive amounts of current which would tend to melt the lining.

Magnesium or magnesium alloy ingots are charged into the furnace through the opening 9, the heating being continued so as to melt the metal and maintain the molten metal at a suitable temperature for subsequent use, usually 1200° and 1350° F. and preferably between about 1275° and 1300° F. for foundry operations, although temperatures as high as 1750° F. are sometimes used as well as temperatures as low as 1100° F. for some of the low-melting magnesium-base alloys.

As the ingots melt, a pool 20 of molten metal is formed which floats on the flux 18 of which a small portion creeps over the top surface forming the protective film 21. Since the heat is supplied solely by electrothermic or resistance heating within the flux body beneath the metal, a very efficient use of the heat is obtained, the metal being melted with a very small heat loss and with a higher melting capacity per unit of hearth area than conventional methods. In addition, the consumption of flux is negligible, since it has little tendency to vaporize from the furnace chamber as there is no circulation of gas out of the furnace chamber and the temperature of the exposed surface of the flux is at a minimum. Furthermore, the flux is not subject to decomposition by reaction with combustion gases which easily hydrolyze the flux producing sludge. In operation, any sludge which tends to form, as in metal refining operations, is carried forward to the sump 13 which is a zone of relative quiescence, the remainder of the flux, particularly that between the electrodes, tending to be in constant agitation when current is passing through it so that sludge particles, if any, tend to remain in suspension in that portion of the molten flux which lies between the electrodes. The metal pool overlying the flux, if not manipulated as in alloying and fluxing, remains relatively quiescent so that flux and oxidic inclusions readily settle out leaving the metal in a highly purified state.

The molten metal may be withdrawn from time to time or continuously through the opening 10 as by ladling, siphoning, or pumping, without withdrawing either flux or sludge as the comparatively thin layer of flux overlying the metal is easily swept aside before withdrawing metal from the pool. Accumulated sludge, if any, is likewise easily removed as by dipping or siphoning from the sump 13 when necessary.

If desired, a special atmosphere, such as one containing helium, argon, carbon dioxide, chlorine, etc., may be introduced through pipe connection 17 into the space in the furnace chamber above the molten metal.

Superheating operations may also be carried out in the furnace by increasing the input of electrical energy so as to raise the temperature of the molten metal into the superheating range, usually about 200 centigrade degrees above the melting point of the magnesium-base alloy involved, as is known in the art.

The invention provides a very advantageous method of melting and maintaining in the molten state magnesium and its alloys, especially for purposes of alloying, superheating, and refining, and providing molten metal for casting or other purposes. Consumption of flux is almost negligible, contamination of the metal by the flux is minimized, and contamination by metallic impurities is eliminated so that an extremely high grade melt is obtained. As an illustration, we have found that by operating a furnace capable of holding approximately a 1500 pound melt of metal and having a rated power input capacity of 200 kva. as a maximum, melting rates for a Dowmetal alloy (H alloy—nominal composition 6 per cent aluminum, 0.2 per cent manganese, 3 per cent zinc, balance magnesium) as high as 550 pounds per hour were obtained. The percentage of metal lost in the operation, covering the melting of more than 20,000 pounds of the alloy, was less than 0.9 per cent of the weight of the metal melted and the amount of flux consumed was less than 1.8 percent of the weight of the metal. The actual power input used averaged 116 kva., representing a thermal efficiency of melting of 69 per cent at about one half of rated capacity. Samples of metal analyzed showed it did not acquire significant amounts of impurities during the melting operation.

We claim:

In an apparatus for melting and maintaining in the molten state magnesium and alloys thereof, the combination comprising a substantially horizontal hearth, side and end walls extending upwardly from the edges of the hearth, said hearth, side and end walls defining a furnace chamber, a roof mounted on the side walls and extending over the furnace chamber, said roof having a closable opening for access to the furnace chamber, said side walls having recesses along their faces inwardly of the furnace chamber and adjacent to the hearth, an electrode in each recess, a terminal connected to one end of each electrode and extending through an end wall, means to cool the terminals, and a well at one end of the hearth, in direct communication with the hearth, said well having a floor substantially below the level of that of the hearth.

JOHN S. PEAKE.
GEORGE T. SERMON.

REFERENCES CITED

The following references are of record in the file of this patent:

UNITED STATES PATENTS

| Number | Name | Date |
|---|---|---|
| 658,536 | Westman | Sept. 25, 1900 |
| 855,480 | Price | June 7, 1907 |

(Other references on following page)

UNITED STATES PATENTS

| Number | Name | Date |
|---|---|---|
| 858,400 | Von Kugelgen et al. | July 2, 1907 |
| 880,743 | Von Kugelgen et al. | Mar. 3, 1908 |
| 929,142 | Ladd | July 27, 1909 |
| 1,297,641 | Bookwalter | Mar. 18, 1919 |
| 1,661,526 | Beck | Mar. 6, 1928 |
| 1,802,265 | Menking | Apr. 21, 1931 |
| 1,875,787 | Wennerstrom | Sept. 6, 1932 |
| 1,937,964 | Moore | Nov. 28, 1932 |
| 1,940,619 | Barstow et al. | Dec. 19, 1933 |
| 2,261,906 | Nelson et al. | Nov. 4, 1941 |
| 2,262,220 | Bennett et al. | Nov. 11, 1941 |
| 2,315,725 | Moller | Apr. 6, 1943 |
| 2,355,761 | Upton | Aug. 15, 1944 |

FOREIGN PATENTS

| Number | Country | Date |
|---|---|---|
| 99,936 | Sweden | Apr. 17, 1939 |
| 125,169 | Austria | Oct. 26, 1931 |
| 557,262 | Great Britain | Nov. 17, 1943 |